June 11, 1935.  M. W. ZANDER  2,004,150
AIR CLEANER
Filed April 12, 1933
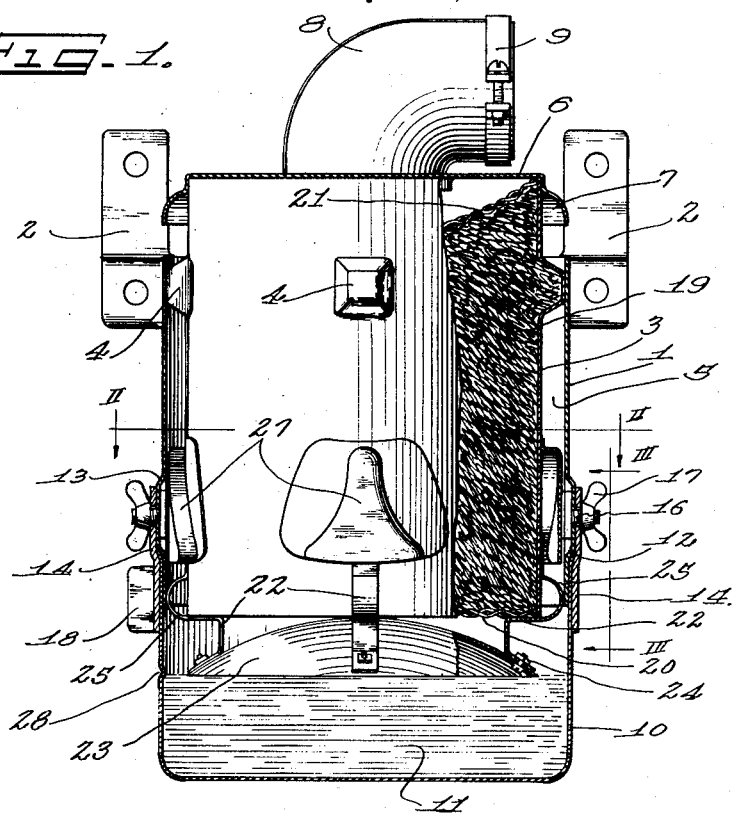
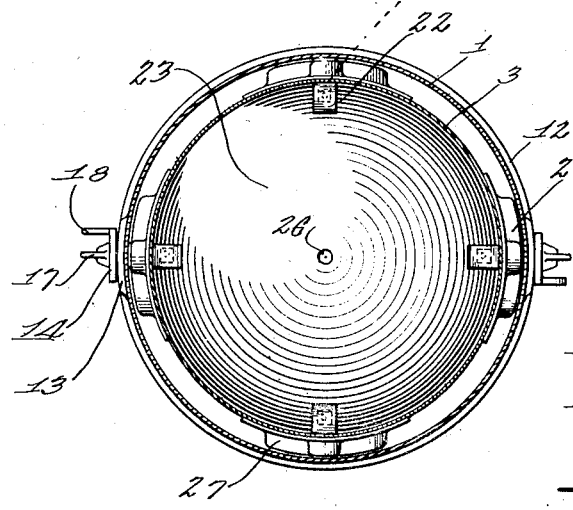
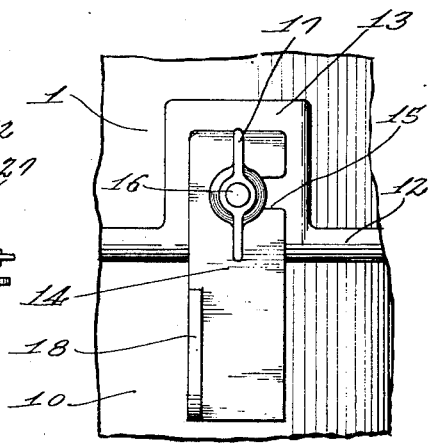
Inventor
MILTON W. ZANDER.

Patented June 11, 1935

2,004,150

UNITED STATES PATENT OFFICE 2,004,150

AIR CLEANER

Milton W. Zander, Chicago, Ill.; Leslie H. Whipp administrator of said Milton W. Zander, deceased Application April 12, 1933, Serial No. 665,649

12 Claims. (Cl. 183—10)

This invention relates to improvements in air cleaners of the type highly desirable for use in connection with internal combustion engines, air compressors, braking mechanisms, and other and various purposes as will be apparent to one skilled in the art.

This invention embodies many of the features and principles embodied in the invention set forth in my copending application entitled "Air cleaner", Serial No. 595,119 filed February 25, 1932, which has now matured into Patent No. 1,951,384, granted March 20, 1924, although this invention includes new refinements and invokes new operating principles together with apparatus for functioning under these principles not embodied in the invention set forth in my aforesaid copending application.

It is well recognized that the most efficient type of air cleaner for internal combustion engines, for example, is the liquid bath type of cleaner, in which the air is thoroughly mixed with a liquid, preferably oil, and most if not all of the impurities are extracted by this washing action with the liquid, in many instances entrained liquid being subsequently removed prior to the exit of air from the cleaner. In many cases, the incoming air has been utilized to activate the liquid in some respects to insure a commingling of air and liquid, and thereby render the cleaner more efficient. In some instances, it has been the practice to give the air a whirling action causing the liquid to rise in the central portion thereof, but such a method leaves an objectionably large space around the central activated liquid for a comparatively free passage of air so that the efficiency of the cleaner is not as great as is desired, especially if the internal combustion engine is running at idling speed. Heretofore, it has also been the practice to resort almost entirely in cleaners of this type to the washing by the oil or other liquid and a subsequent filtering of the air to remove whatever impurities may remain therein and also remove the entrained liquid.

Obviously, it is highly desirable to provide a cleaner of greater efficiency, especially of greater efficiency at idling speed of an internal combustion engine, and the operation of the cleaner is greatly enhanced if a principle of operation is involved which releases foreign particles from the air without depending entirely upon the liquid washing and subsequent filtering for the entire cleansing of the air.

Accordingly, it is an object of this invention to provide an air cleaner containing a liquid bath, and in which the incoming air turbulates the liquid.

It is also an object of this invention to provide an air cleaner containing a liquid bath, in which the incoming air is guided so that it will turbulate the liquid in the bath in a non-whirling action, thus insuring a thorough commingling of air and liquid.

Still another object of this invention is the provision of an air cleaner in which the incoming air is guided in streams of different direction, and these streams are caused to conflict with each other to thereby release foreign particles carried by the air.

It is also an object of this invention to provide an air cleaner in which incoming air is guided in streams of different directions, which streams are caused to conflict with each other in the vicinity of liquid in a liquid sump, thereby causing the air to turbulate the liquid.

Another object of this invention is the provision of an air cleaner of the type wherein incoming air is caused to effect a turbulating action in the sump liquid, the arrangement including a baffle disposed above the liquid to insure a thorough commingling of air and liquid, the baffle having an aperture therein to prevent any dead air pocketing.

Still a further object of this invention is the provision of an air cleaner of the character described herein, where all of the parts are attached together in a way to eliminate rattling of any portion of the cleaner due to vibration, and still permit the necessary parts to be readily removed for the purposes of cleansing or replacement of liquid.

While some of the more salient features, characteristics and advantages of the present invention have been above pointed out, others will become apparent from the following disclosures.

The invention includes these and other features of construction, and combinations of parts hereinafter described and shown in the preferred form in the drawing, as more particularly indicated by the claims.

On the drawing:

Figure 1 is a part sectional, part elevational view, showing the outer shell of the filter casing in vertical section, with interior portions of the filter in elevation with parts broken away disclosing sections.

Figure 2 is a plan sectional view taken substantially as indicated by the line II—II of Figure 1, with the filtering element removed.

Figure 3 is an enlarged fragmentary elevational view taken substantially as indicated by the line III—III of Figure 1.

As shown on the drawing:

In the illustrated embodiment of this invention, there is shown an air cleaner of a type that is connectible to the air intake of a carburetor of an internal combustion engine. The casing includes an outer shell 1 to which a pair of brackets 2 are attached in any desired manner for supporting the device on an engine block or in any other suitable location for use. An inner shell 3 is disposed within the shell 1 and spaced therefrom by means of projections 4, preferably stamped from the inner shell, to provide an annular inlet passage 5. The two shells 1 and 3 are preferably spot-welded at the points of contact between the outer shell and the projections 4. The inner shell is also provided with a cover 6 secured to the top of the shell in any desired manner, and this cover includes a hood 7 which overhangs the inlet opening between the two shells to prevent débris from falling into the inlet. The cover 6 is apertured to provide a clean air outlet through an elbow 8 secured to the cover and provided with a suitable clamp 9 for attaching the elbow to the air intake of a carburetor.

The casing also includes a cup-like container 10 removably and telescopically engageable with the lower portion of the outer shell 1, this container providing a liquid sump for containing a liquid 11, such as crank case oil or any other suitable liquid. Obviously, the liquid in the sump is in the path of air traveling from the inlet 5 to the outlet elbow 8, the incoming air entering between the hood 7 and the top of the shell 1, passing downwardly through the annular inlet 5, commingling with the liquid 11, and passing upwardly through the inner shell 3 to the elbow 8.

A short distance above its lower end, the outer shell 1 is outwardly beaded as at 12 (Figure 3) and at diametrically opposed points it is provided immediately above the bead 12 with outwardly pressed faces 13. The bead 12 acts as a buffer for the upper end of the container 10 when the same is attached to the shell 1.

In line with the faces 13, the container 10 is provided with a pair of upstanding brackets 14 each being provided in the upper portion thereof with a slot 15 engageable over a suitable bolt 16, projecting outwardly through the face 13, upon a slight rotation of the container 10 relative to the shell 1. The engagement may be secured on each side of the cleaner by means of a thumb nut 17, and each of the brackets 14 is further provided with an outstanding thumb lever or handle 18 to aid in rotating the container 10.

The inner shell 3 is preferably substantially filled with a mass of filtering material 19, compressed wavy wire, or any other suitable material, which is held in position by a relatively heavy bottom screen 20 and a similar top screen 21, the latter screen being dished inwardly to lessen restriction adjacent the exit for cleaned air. The mass of filtering material is held in position by a plurality of inwardly bent bracket members 22 secured to the inner shell 3 by spot-welding, brazing, or any other suitable manner at spaced intervals thereabout. These bracket members underlie the bottom screen 20 and are then bent downwardly to support a dome-shaped baffle 23 by means of suitable bolt and nut connections 24, these connections being comparatively tight to eliminate rattling of the parts due to vibration. The brackets 22 are outwardly bent in an arc as at 25 to aid in maintaining the proper space between the shells 1 and 3 for incoming air, the arcs 25 contacting the inner side of the shell 1 adjacent the bottom thereof.

The baffle 23 also contacts adjacent its central portion with the bottom screen 20 beneath the filter mass and aids in stabilizing this mass. This baffle is also provided with an aperture 26 in the top thereof to eliminate a dead air pocket when the liquid 11 is swept up against the undersurface of the baffle by incoming air.

One of the most important features of the present invention is the incorporation of air guiding members, which will, for the purpose of clarity, be called turbulators 27, which are spot-welded or secured in any other suitable manner at annularly spaced intervals on the inner shell 3. Each turbulator is preferably a metal stamping and curved in conformity to the curvature of the shell 3. Each turbulator extends outwardly substantially the width of the inlet passage 5, and each is shaped in somewhat the form of a triangle with one of the apices up, although the apices are rounded and the upper sides of the triangle are inwardly arcuate. As so shaped and situated where it is, each turbulator guides incoming air into two diverging streams. A stream of air from one side of one turbulator will conflict with the stream of air from the near side of the adjacent turbulator, and this confliction of air currents is sufficient to release at least some of the foreign particles carried by the air and permit gravitation of the particles. However, it should be further noted that the confliction of air currents occurs immediately adjacent the liquid 11 in the container 10 and such confliction causes a turbulation of the liquid. The turbulation of the liquid will not be a whirling of the liquid but the liquid will surge upwardly between the extended axes of adjacent turbulators, and these surges or waves will tend to move back and forth between the extended axes of the turbulators, the major part of this activation occurring underneath the baffle 23, whereby there will be a thorough commingling of air and liquid resulting in the thorough cleansing of the air.

As many turbulators 27 may be used as are found most desirable for the particular installation of the cleaner. It is preferable if more than one turbulator is used, that the turbulators be equally spaced around the inner shell 3. In the event only one turbulator affords a sufficient activation of liquid 11, then only one turbulator need be used. Of course, the casing need not be cylindrical as shown in the drawing, and circumstances will arise where the shape of the casing will also have a bearing upon the number of turbulators used. The addition of the turbulators renders the cleaner extremely efficient, the structure shown having an efficiency in most cases in excess of 98% when connected to an internal combustion engine running at idling speed, and an efficiency very closely approaching 100% when the engine operates at normal running speed.

In operation, the present invention is extremely simple. The container 10 is first filled substantially to the level indicated by the partial bead 28 with used crank case oil or any other suitable liquid and replaced in position as previously described. Assuming that the air cleaner is connected by the clamp 9 to the intake of a carburetor on an internal combustion engine, the suction of the internal combustion engine will drive the air through the cleaner. Air enters the cleaner through the annular inlet, passes downwardly through the passage 5, being guided in the streams of different direction by the turbulators 27, causing a turbulence of the liquid 11 underneath the baffle 23, again changing direction by virtue of the baffle, passing upwardly around the edge of the baffle through the filter mass 19 wherein the entrained liquid is removed from the air, and the cleansed air leaving the cleaner through the elbow 8.

New and novel means for cleaning air incorporated in the present invention will be readily apparent from the foregoing. Briefly, these means function in guiding streams of air in different direction toward the liquid sump, causing these streams of air to conflict in the vicinity of the liquid in the sump to turbulate this liquid, whereby the air is thoroughly mixed with the liquid and cleansed, and subsequently removing entrained liquid from the air.

From the foregoing it will be apparent that I have provided an air cleaner of very high efficiency and operating upon a new and positive principle. The air cleaner is very simple in construction and easy to install. It will also be appreciated that the cleaner is sturdily designed and constructed so as to eliminate rattling even in the face of extreme vibration, and that the cleaner may be built in a sufficiently small size and with sufficient economy to warrant its installation in practically any type of automotive vehicle, in addition to the many other uses that will be apparent to one skilled in the art for this invention.

I am aware that many changes may be made and numerous details of construction may be varied through a wide range without departing from the principles of this invention, and I, therefore, do not purpose limiting the patent granted hereon, otherwise than is necessitated by the prior art.

I claim as my invention:

1. In an air cleaner, a casing having an air inlet and an outlet spaced from said inlet, said casing having a liquid sump in the path of air traveling from said inlet to said outlet, and a plurality of guiding members disposed in the air path in advance of said liquid sump, each of said members being shaped to cause diverging streams of air, and said members being so located relatively to each other that streams of air are caused to conflict in the vicinity of the liquid in said sump and turbulate said liquid.

2. In an air cleaner, a casing having an inlet and an outlet spaced from said inlet, said casing having a liquid sump in the path of air traveling from said inlet to said outlet, means also in the air path in advance of said sump to direct the incoming air in a plurality of directions to turbulate the sump liquid, and baffle means in said casing arranged to cause a change in direction of the air after contact with but before the air is free from the turbulating liquid.

3. In an air cleaner, a casing having an inlet and an outlet spaced from said inlet, said casing having a liquid sump in the path of air traveling from said inlet to said outlet, guiding means in the air path in advance of said liquid sump to guide incoming air into streams that conflict with each other in the vicinity of the sump liquid causing a turbulence of the sump liquid, and baffle means arranged to cause a change in direction of the air after contact with but before said air is free from the sump liquid.

4. In an air cleaner, a casing having an inlet and an outlet spaced from said inlet, said casing having a liquid sump therein in the path of air traveling from said inlet to said outlet, and a plurality of air guiding members laterally spaced apart in the air path in advance of said liquid sump, said members each being shaped to direct the air in diverging streams and located in such relationship one to another that various air streams conflict with each other in the vicinity of the sump liquid and turbulate said liquid.

5. In an air cleaner, a casing having an inner wall and an outer wall to provide therebetween an annular air inlet, said casing having an air outlet spaced from said inlet, said casing also having a liquid sump in the path of air traveling from said inlet to said outlet, and a plurality of annularly spaced guiding members in said inlet in advance of said liquid sump, each of said members being shaped to guide incoming air in diverging streams, whereby said air turbulates the sump liquid.

6. In an air cleaner, a casing having an air inlet and an outlet spaced from said inlet, means defining a path for air traveling from said inlet to said outlet, and air guiding means in said path arranged to direct incoming air into a plurality of different contrary directions causing rushing air streams to forcefully conflict prior to the exit of air through said outlet, and baffle means between the area of confliction and said outlet to cause a change in direction of the air prior to its exit from said casing.

7. In an air cleaner, a casing having an air inlet and an outlet spaced from said inlet, a cup-like element attachable to the lower portion of said casing to form a liquid sump in the path of air traveling from said inlet to said outlet, a baffle in said casing above said sump and in advance of said outlet to cause a change in direction of the air before the air is free from the sump liquid, and bracket means for supporting said baffle and guiding said cup-like element in its removal and replacement.

8. In an air cleaner, a casing having an inlet and an outlet spaced from said inlet, said casing having a liquid sump in the path of air traveling from said inlet to said outlet, guiding means arranged to cause the air to turbulate the sump liquid, and a dome-shaped baffle over said sump to cause a thorough washing of air by sump liquid, said baffle having an aperture therein to eliminate a dead air pocket.

9. In an air cleaner, a casing having an air inlet and an outlet spaced from said inlet, said casing having a sump therein for a cleansing liquid, means defining a path for incoming air from said inlet to said sump, means in said path in advance of the liquid level in said sump shaped to direct incoming air in a plurality of streams of contrary directions, the arrangement being such that said streams will conflict adjacent the liquid level causing a turbulence of the liquid, and means between said sump and said outlet to cause a change in direction of the air while the air is still mixed with sump liquid.

10. In an air cleaner, a casing having an air inlet and an outlet spaced from said inlet, said casing having a liquid sump therein in such location that incoming air will mix with sump liquid, and an arcuate baffle between said sump and said outlet in the path of air mixed with sump liquid and over which the air travels, said baffle having an aperture therein to eliminate the formation of a dead air pocket.

11. An an air cleaner, a casing having an air inlet and an outlet spaced from said inlet, said casing having a liquid sump in such location that incoming air will mix with sump liquid, and a plurality of spaced guiding members in the path of incoming air in advance of the sump liquid, each of said guiding members having in general a triangular shape with an apex towards said inlet and inwardly arcuate sides leading from said apex to cause diverging streams of air.

12. In an air cleaner, a casing having an air inlet and an outlet spaced from said inlet, and spaced guiding members disposed in the path of incoming air, each guiding member being in general of triangular shape with an apex towards said inlet to cause diverging streams of air, said members being sufficiently close together to cause confliction of air streams.

MILTON W. ZANDER.